United States Patent [19]

Iwai et al.

[11] Patent Number: 5,064,900
[45] Date of Patent: Nov. 12, 1991

[54] CURABLE UNSATURATED POLYESTER RESIN COMPOSITION

[76] Inventors: Hisayuki Iwai, 1-24-5 Shiratori, Togo-cho, Aichi-gun, Aichi; Yasuhiro Mishima, 4-15-24 Yokoyama-cho, Toyota, Aichi; Ken Hatta, 5-38 Tanaka-cho, Toyota, Aichi; Kenichi Nishino, 3-13-67 Shimo-Hozumi, Ibaraki, Osaka; Sanji Aoki, 311-6 Ryofukuji, Kashiba-cho, Kita-Katsuragi-gun, Nara; Tatsuhiko Ozaki, 6-74 Eiraku-cho, Nishio, Aichi; Hirotaka Wada, 2-5 Minato-machi, Gamagori, Aichi, all of Japan

[21] Appl. No.: 469,748

[22] Filed: Jan. 19, 1990

Related U.S. Application Data

[63] Continuation-in-part of Ser. No. 442,831, Nov. 29, 1989, abandoned.

[30] Foreign Application Priority Data

Nov. 30, 1988 [JP] Japan .................................. 63-302576

[51] Int. Cl.$^5$ .............................................. C08L 67/06
[52] U.S. Cl. ........................................ 525/69; 525/170; 523/522
[58] Field of Search .................. 525/69, 170; 523/522

[56] References Cited

U.S. PATENT DOCUMENTS 4,670,485  6/1987  Hesse .................................. 523/436

Primary Examiner—Patricia Short
Attorney, Agent, or Firm—Heller, Ehrman, White & McAuliffe

[57] ABSTRACT

A curable unsaturated polyester resin composition contains graft copolymers each having 10–60 weight % of a first constituent given by

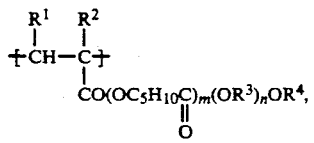

38–89.7 weight % of a second constituent given by

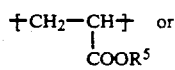

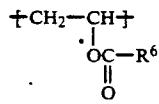

and 0.3–2 weight % of a third constituent which is a vinyl monomer unit having carboxylic acid or carboxylic anhydride groups, unsaturated polyester, vinyl monomer, a filler, a curing catalyst, and reinforcing fibers, where either of $R^1$ and $R^2$ is H, the other being either H or $CH_3$, $R_3$ is ethylene group or propylene group, $R^4$ is hydrocarbon group with 1–18 carbon atoms, $R^5$ is alkyl group with 1–4 carbon atoms, $R^6$ is alkyl group with 1–3 carbon atoms, m is 6–90 and n is 1–5.

12 Claims, No Drawings

CURABLE UNSATURATED POLYESTER RESIN COMPOSITION

This is a continuation-in-part of application Ser. No. 442,831, filed Nov. 29, 1989, now abandoned.

BACKGROUND OF THE INVENTION

This invention relates to curable unsaturated polyester resin compositions.

Recently, unsaturated polyester sheet molding compounds (SMC) and bulk molding compounds (BMC) are coming to be recognized as excellent plastic materials for automotive exterior body panels and are applied not only to main exterior panels such as engine hoods, roofs and trunk lids but also to exterior parts such as spoilers, air-intakes and rocker panels. This invention relates to improved curable unsaturated polyester resin compositions represented by such SMC and BMC.

It is known, however, that unsaturated polyester resins have a large shrinkage when they are cured. For this reason, molded products obtained from such unsaturated polyester tend to easily crack or warp. Glass fibers used as reinforcement tend to become easily visible and pinholes (porosity) appear to adversely affect the surface appearance and paintability. It is also a problem that they have inferior dimensional stability.

In view of the above, it has been known in order to make up for such shortcomings to mix thermoplastic resins such as polystyrene, polyvinyl acetate, polymethyl methacrylate and block copolymers of a conjugated diene monomer and an aromatic vinyl monomer as an additive to unsaturated polyester resins (29th National SAMPE Symposium, Apr. 3-5, 1984). There is yet to be discovered, however, a thermoplastic resin which is satisfactory from all points of view such as compatibility and dispersibility when mixed with unsaturated polyester resins, ability to reduce shrinkage, surface appearance and paintability. At the present time, therefore, they are being used only for some, and not all, of these required characteristics. Since molding compounds to be applied to automotive exterior body panels, in particular, are required to have surface qualities comparable to those of a steel sheet, unsaturated polyester resin compounds containing known thermoplastic resins are hardly satisfactory.

As an additive to be used with unsaturated polyester resins, Japanese Patent Publication Tokkai 60-99158 has disclosed the use of polystyrene-polyester graft copolymers having a polyester chain in the branch. Examples of the method of forming a polyester chain in the branch disclosed in this reference include condensation polymerization between a dibasic acid and glycol, ring-opening polymerization of polycaprolactone and ring-opening polymerization of acid anhydride and alkylene oxide. The two terminal groups of these polyester chains are hydroxyl or carboxylic acid groups and macromonomers are obtained by reacting one of these terminal groups with a reagent of various types in order to introduce a vinyl group and a graft copolymer is produced by copolymerization of such a macromonomer with another vinyl monomer.

Such a prior art method, however, has the following problems. Firstly, since use is made of a macromonomer with hydroxyl and carboxylic acid groups as terminal groups, gels of an unknown structure are easily produced and this makes it difficult to obtain a graft copolymer of a well controlled structure. Secondly, if a macromonomer is obtained by a method described above, bifunctional macromonomers with vinyl groups introduced into both terminals are inevitably generated as by-products and since it is extremely difficult to remove such bifunctional macromonomers by purification, these bifunctional macromonomers eventually come to participate in the copolymerization reaction. As a result, cross-linking gels are produced significantly.

Graft copolymers obtained by copolymerization of ethylenic unsaturated monomer onto the principal chain of polycaprolactone (U.S. Pat. No. 3,760,034) and graft copolymers obtained by copolymerization of polyaduct (such as polyamide and polyether) or polycondensate (such as polyester) onto the principal chain of polydiene-type elastomer (U.S. Pat. No. 4,670,485) have also been considered. According to these references, graft copolymers are obtained by reacting an ethylenic unsaturated monomer or a macromonomer with a polymer on the principal chain of polycaprolactone or polydiene-type elastomer in the presence of an initiator agent for radical polymerization. By these prior art methods, however, the degree of grafting of ethylenic unsaturated monomers and macromonomers is poor and a large amount of homopolymers comes to be mixed with the product. Thus, it becomes difficult to separate the desired graft copolymer from the reaction product. Moreover, it is difficult to control the degree of grafting and the graft chain length, and there also arises the problem that generation of three-dimensional gel materials cannot be avoided.

In summary, such graft copolymers produced by prior art methods cannot possibly satisfy the conditions of high surface flatness and paintability required for the application to automotive exterior body panels.

SUMMARY OF THE INVENTION

It is therefore an object of the present invention to provide improved curable unsaturated polyester resin compositions with which the aforementioned problems can be resolved.

The present invention has been completed by the present inventors as a result of their diligent studies in view of the above and other objects and is based on their discovery that compositions containing unsaturated polyester, vinyl monomer, a filler a curing catalyst- and reinforcing fibers and further having specified a kind of graft copolymers added thereto have not only superior characteristics regarding mechanical strength, thermal stability, waterproofing and chemical proofing but also a high level of surface flatness and paintability required for application to automotive exterior body panels.

DETAILED DESCRIPTION OF THE INVENTION

This invention relates to curable unsaturated polyester resin compositions characterized as comprising graft copolymer, unsaturated polyester, vinyl monomer, filler, curing catalyst and reinforcing fiber, each of the graft copolymers containing 10-60 weight % of Constituent I given by

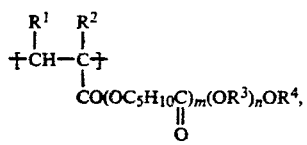

38-89.7 weight % of Constituent II given by

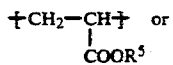

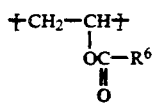

and 0.3-2 weight % of Constituent III which is a vinyl monomer unit having carboxylic acid or carboxylic anhydride groups, where either of $R^1$ and $R^2$ is H, the other being either H or $CH_3$, $R^3$ is ethylene group or propylene group, $R^4$ is hydrocarbon group with 1-18 carbon atoms, $R^5$ is alkyl group with 1-4 carbon atoms, $R^6$ is alkyl group with 1-3 carbon atoms, m is 6-90 and n is 1-5.

The graft copolymers used in the present invention are characterized as containing Constituents I, II and III where Constituent I is represented by ester macromonomer units of $\alpha$, $\beta$-unsaturated carboxylic acid such as crotonic acid, acrylic acid and methacrylic acid and Constituent II is represented by carboxylic vinyl monomer units such as vinyl acetate, vinyl propionate, vinyl lactate and vinyl isolactate or acrylate monomer units such as methyl acrylate, ethyl acrylate, n-propyl acrylate, isopropyl acrylate, n-butyl acrylate, isobutyl acrylate and t-butyl acrylate. They may be used either singly or as a combination of two or more kinds but vinyl acetate and ethyl acrylate are most effective.

Examples of aforementioned Constituent I include crotonic acid, acrylic acid and methacrylic acid ester macromonomer units which can be obtained by a ring-opening addition reaction of alkoxy or phenoxy glycol such as (poly) alkylene glycol monoalkylether and (poly) alkylene glycol monophenylether with $\epsilon$-caprolactone and subsequently by an esterification reaction or an ester exchange reaction using crotonic acid, acrylic acid, methacrylic acid or an ester-forming derivative thereof.

Examples of macromonomers from which Constituent I can be obtained include Macromonomer M-1 given by

Macromonomer M-2 given by

Macromonomer M-3 given by

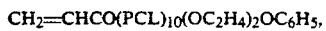

Macromonomer M-4 given by

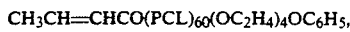

where PCL is given by

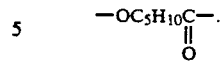

Examples of vinyl monomers from which aforementioned Constituent III can be obtained include those having a carboxylic acid group or a carboxylic anhydride group of crotonic acid, acrylic acid, methacrylic acid, maleic anhydride, maleic acid, itaconic anhydride or itaconic acid.

Preferable combinations of Constituents I and II for graft copolymers according to the present invention are obtained, for example, if vinyl carboxylate monomer unit is selected as Constituent II when Constituent I is crotonic acid ester macromonomer unit and if acrylic acid ester monomer unit is selected as Constituent II when Constituent I is acrylic acid or methacrylic acid ester macromonomer unit.

The ratio at which the constituents of the graft copolymers of the present invention may be contained is within the range given in units of weight % by Constituent I/Constituent II/Constituent III= 10-60/-38-389.7/0.3-2. If the ratio is not within the range given above, the advantageous effects of the graft copolymers of the present invention cannot be fully attained.

Graft copolymers of the present invention can be synthesized by using a macromoner as a source material for Constituent I, a vinyl monomer serving as a source material for Constituent II and a vinyl monomer serving as a source material for Constituent III. Known methods may be used for the synthesis such as solution polymerization, emulsion polymerization and suspension polymerization. From the point of view of the purpose to be served, the molecular weight of the aforementioned macromonomer should be in the range of 800-10,000 and more preferably in the range of 1000-8000. Moreover, it is preferred that the molecular weight of the synthesized graft copolymer of the present invention be 10,000 or greater and, in particular, in the range of 20,000-200,000.

It is desirable to use graft copolymers of the present invention by mixing at the rate of 10-100 wt % with respect to an unsaturated polyester, and more preferably at the rate of 20-80 wt %. These graft copolymers are generally mixed with an olefinic unsaturated monomer to make, for example, a styrene solution to be mixed with a similar solution of an unsaturated polyester to be used. Depending on the kind of graft copolymer, however, it may not be necessary to form a solution in a vinyl monomer such as styrene before adding to unsaturated polyester. In such a case, a specified amount of vinyl monomer is added to unsaturated polyester and the graft copolymer is directly added to the mixture.

The unsaturated polyester which may be used according to the present invention can be obtained by a condensation process between $\alpha,\beta$-olefinic unsaturated dicarboxylic acid and divalent glycol. Supplementally, use may be made of saturated dicarboxylic acid or aromatic dicarboxylic acid as the dicarboxylic acid. Dicyclopentadiene and the like which reacts with carboxylic acid may be used together with glycol.

Examples of $\alpha,\beta$-olefinic unsaturated dicarboxylic acid include maleic acid, fumaric acid, itaconic acid, citraconic acid and anhydrides of these dicarboxylic acids. Examples of dicarboxylic acid which may be used supplementally include adipic acid, sebacic acid, succinic acid, glutaric acid, phthalic anhydride, o-phthalic acid, isophthalic acid, terephthalic acid, tetrahydrophthalic acid and tetrachlorophthalic acid. Examples of divalent glycol include alkane diols, oxyalkane diols and diols obtained by adding ethylene oxide or propylene oxide to bisphenol A. Monools and trivalent triols may be used supplementally. Examples of alkane diols include ethylene glycol, 1,2-propylene glycol, 1,3-propylene glycol, 1,3-butane diol, 1,4-butane diol, neopentyl glycol, 1,5-pentane diol, 1,6-hexane diol and cyclohexane diol. Examples of oxyalkane diol include dioxyethylene glycol and trioxyethylene glycol. Examples of monovalent and trivalent alcohols include octyl alcohol, oleyl alcohol and trimethylol propane.

The synthesis of unsaturated polyester is generally carried out with heating and the reaction is continued while water as the by-product is removed. Its molecular weight is generally 800–4000 and its acid value is 20–60.

Examples of vinyl monomer used according to the present invention include styrene, p-chlorostyrene, vinyl toluene, di-vinyl benzene and esters of acrylic acid or methacrylic acid with alcohol having 1-18 carbon atoms such as methyl methacrylate, butyl acrylate, hydroxypropyl acrylate, hydroxypropyl methacrylate and trimethylol propane trimethacrylate. Examples of filler to be used according to the present invention include calcium carbonate, talc, silica, clay, glass powder and glass balloons. As for the curing catalysts to be used according to the present invention, use may be made of anything as long as it is decomposed at 80°–200° C. to generate radicals and starts polymerization of unsaturated polyesters and vinyl monomers Examples of such catalyst include t-butyl peroxy octoate, t-butyl peroxybenzoate, 1,1-bis(t-butyl peroxy) 3,3,5-trimethyl cyclohexane, t-butyl peroxy 2-ethylhexyl carbonate and dicumyl peroxide.

Examples of reinforcing fibers to be used according to the present invention include glass fibers, carbon fibers, polyamide fibers, vinylon fibers, polyester fibers and boron fibers. If necessary, not only a pigment such as titanium dioxide, carbon black, iron oxide red and phthalolcyanine blue, a mold release agent such as zinc stearate and calcium stearate, and a thickener such as magnesium oxide, magnesium hydroxide, calcium oxide and calcium hydroxide, but a curing accelerator, a curing retarder, a thermal stabilizer and a weatherability stabilizer may also be added.

In what follows, examples of graft copolymer according to the present invention as well as comparison examples are presented in order to more clearly describe the present invention but it goes without saying that these examples are not intended to limit the scope of the present invention.

EXAMPLES

Synthesis of Graft Copolymer A

Placed inside a flask were 50 g of ethyl cellosolve and 1 g of tetrabutyl titanate and it was heated to 130° C. after its interior was replaced with nitrogen. After 2200 g of ε-caprolactone was dropped over a period of one hour, a reaction was continued for 2 hours at 150° C. to obtain a caprolactone adduct of hydroxyl value of 14.1.

Next, 250 g of the caprolactone adduct thus obtained, 8.0 g of methacrylic acid, 250 g of toluene, 0.5 g of sulfuric acid and 0.1 g of hydroquinone were placed inside a flask for an esterification reaction over a period of 8 hours with heating in reflux. After the content was cooled down to 60° C., the sulfuric acid was neutralized with sodium hydrogencarbonate and the salt thus obtained by neutralization was dissolved by adding water. The water layer and the toluene layer were separated and Macromonomer M-1 (acid value=0.4, hydroxyl value =1.1, and molecular weight=about 3970) was obtained by removing water and the solvent from the toluene layer under a reduced pressure. Hereinafter, molecular weights are polystyrene equivalent values obtained by the GPC method.

Placed thereafter inside a flask were 20 g of aforementioned Macromonomer M-1, 79 g of ethyl acrylate, 1 g of methacrylic acid and 100 g of toluene and it was heated after its interior was replaced with nitrogen. When the interior temperature reached 60° C., 1 g of azobisisobutylonitrile was added together with 50 g of toluene for a reaction over a period of 10 hours. Next, the reaction solution was cooled to the room temperature and poured into 600 ml of isopropyl alcohol to cause the copolymer to precipitate. After the deposited white precipitate was washed three times with 150 ml of isopropyl alcohol, it was dried in vacuum at 70° C. to synthesize Graft Copolymer A. Graft Copolymer A contained 76 weight % of ethyl acrylate and 1 weight % of methacrylic acid and its molecular weight was about 62000.

Synthesis of Graft Copolymer B

Placed inside a flask were 250 g of the caprolactone adduct obtained in the synthesis of Graft Copolymer A described above, 8.0 g of crotonic acid, 250 g of toluene, 0.5 g of sulfuric acid and 0.01 g of hydroquinone and it was heated in reflux for an esterification reaction over a period of 8 hours. After the content was cooled down to 60° C., the sulfuric acid was neutralized with sodium hydrogencarbonate and the salt thus obtained by neutralization was dissolved by adding water. The water layer and the toluene layer were separated and Macromonomer M-2 (acid value=0.7, hydroxyl value=2.1, and molecular weight=about 4020) was obtained by removing water and the solvent from the toluene layer under a reduced pressure.

Placed thereafter inside a flask were 40 g of aforementioned Macromonomer M-2, 59 g of vinyl acetate, 1 g of crotonic acid and 25 g of methanol and it was heated after its interior was replaced with nitrogen. When the interior temperature reached 62° C., 10 ml of 5% methanol solution of azobisisobutyronitrile was added for a reaction over a period of 5 hours. Next, the reaction solution was cooled to the room temperature and poured into 600ml of isopropyl alcohol to cause the copolymer to precipitate. After the deposited white precipitate was washed three times with 150 ml of isopropyl alcohol, it was dried in vacuum at 70° C. to synthesize Graft Copolymer B containing 53 weight % of vinyl acetate and 1 weight % of crotonic acid and having molecular weight of about 140000.

Graft Copolymers C and D were similarly synthesized. For the purpose of comparison, Graft Copolymers E, F and G, which do not embody the present invention, were also synthesized. These synthesized graft copolymers are described in Table 1.

TABLE 1

| Graft Copolymer | Constituents | | | I/II/III (wt %) | Molecular Weight ($\times 10^4$) |
| --- | --- | --- | --- | --- | --- |
| | I | II | III | | |

TABLE 1-continued

| | | | | | |
|---|---|---|---|---|---|
| A | I-1 | II-1 | III-1 | 23/76/1 | 6.2 |
| B | I-2 | II-2 | III-2 | 46/53/1 | 14 |
| C | I-3 | II-1 | III-3 | 15/84/1 | 8.1 |
| D | I-4 | II-2 | III-4 | 29.5/70/0.5 | 16 |
| E | — | II-1 | III-1 | 0/99/1 | 5.8 |
| F | I-5 | II-1 | III-1 | 22/77/1 | 7.5 |
| G | I-2 | II-1 | III-2 | 66/33/1 | 6.8 |

(Notes) In the above,

I-1: 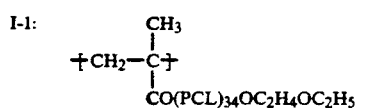

I-2: 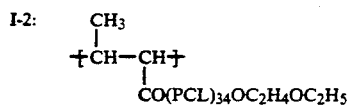

I-3: 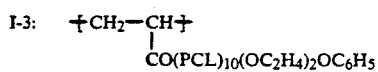

I-4: 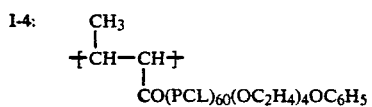

I-5: 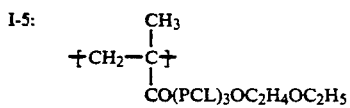

II-1: 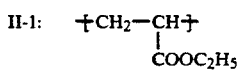

II-2: 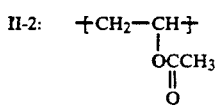

III-1: 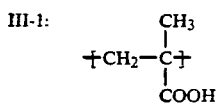

III-2: 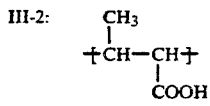

III-3: 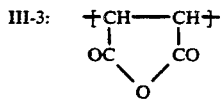

III-4: 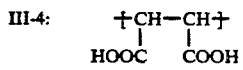

Test 1

The graft copolymers shown in Table 1 were used to prepare SMC as shown in Table 2 wherein unsaturated polyester X is synthesized from 0.8 mol of maleic acid anhydride, 0.2 mol of isophthalic acid and 1.0 mol of propylene glycol, containing styrene by 40 weight % and having acid acid value of 18.0 and viscosity of 1210 cps at 25° C. Molded plates having ribs were obtained from the SMCs thus produced. The conditions of molding were as follows:

| | |
|---|---|
| Mold temperature: | 145° C. |
| SMC coverage ratio: | 40% |
| Pressure: | 100 kgf/cm$^2$ |
| Cure time: | 120 seconds |
| Dimension of plates (exclusive of the ribs): | 300 × 400 × 2.7$^t$ mm |

TABLE 2

| Component | Weight part |
|---|---|
| Unsaturated polyester X | 50 |
| Graft copolymer | 15 |
| Styrene | 35 |
| Calcium carbonate | 150 |
| t-butylperoxy benzoate | 1.5 |
| Zinc stearate | 4.0 |
| Magnesium oxide | 1.0 |
| Glass fibers of 2.5 cm in length | 100 |

Surface smoothness of these molded plates thus obtained was measured along two lines. Along each of these lines, 300 points were examined at a pitch of 1 mm. Fifth-power regression curves were calculated from these points and the average deviations ($\mu$) of the individual measurement points were obtained. The average values of the individual average deviations of each line were used as the measure of surface smoothness. The results are shown in Table 3. It is clearly observable that each of the compositions according to the present invention has superior surface flatness.

TABLE 3

| Test | Graft Copolymer | Surface Smoothness ($\mu$) |
|---|---|---|
| 1 | A | 4.5 |
| 2 | B | 3.7 |
| 3 | C | 4.1 |
| 4 | D | 5.2 |
| Comparison | | |
| 1 | E | 10.5 |
| 2 | F | 11.2 |

Test 2

The graft copolymers shown in Table 1 were used to prepare another group of SMC as shown in Table 4 wherein unsaturated polyester Y is synthesized from 0.7 mol of propylene glycol, 0.3 mol of dicyclopentadiene and 1.0 mol of maleic anhydride, containing styrene by 35 weight % and having acid value of 21.0 and viscosity of 950 cps at 25° C. Molded plates were obtained from the SMC thus produced as explained above and their surface flatness was measured.

TABLE 4

| Component | Weight part |
|---|---|
| Unsaturated polyester Y | 50 |
| Graft copolymer | 15 |
| Styrene | 35 |
| Calcium carbonate | 200 |
| 1,1-bis(t-butyl peroxy) 3,3,5-trimethyl cyclohexane | 1.0 |
| Zinc stearate | 4.0 |
| Magnesium oxide | 1.0 |
| Glass fibers of 2.5 cm in length | 110 |

These plates were also coated with a two-component urethane acrylate primer and after the coating hardened at 120° C. for 30 minutes, their adhesion was examined by crosshatch tests. The results of all these tests are shown in Table 5 which clearly shows that compositions according to the present invention all have superior surface flatness and paintability.

TABLE 5

| | Graft Copolymer | Surface Flatness (μ) | Pinholes | Adhesion |
|---|---|---|---|---|
| Test | | | | |
| 5 | A | 3.5 | none | 100/100 |
| 6 | B | 2.8 | none | 100/100 |
| Comparison | | | | |
| 3 | G | 8.6 | slightly | 95/100 |

What is claimed is:

1. A curable unsaturated polyester resin composition comprising
graft copolymers each containing 10–60 weight % of a first constituent given by

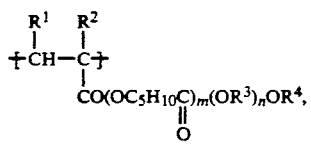

38–89.7 weight % of a second constituent given by

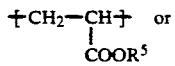

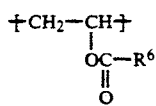

and 0.3–2 weight % of a third constituent which is a vinyl monomer unit having carboxylic acid or carboxylic anhydride groups,
unsaturated polyester,
vinyl monomer,
filler,
curing catalyst, and
reinforcing fiber,
where either of $R^1$ and $R^2$ is H, the other being either H or $CH_3$, $R^3$ is ethylene group or propylene group, $R^4$ is hydrocarbon group with 1–18 carbon atoms, $R^5$ is alkyl group with 1–4 carbon atoms, $R^6$ is alkyl group with 1–3 carbon atoms, m is 6–90 and n is 1–5.

2. The curable unsaturated polyester resin composition of claim 1 wherein said first constituent is given by

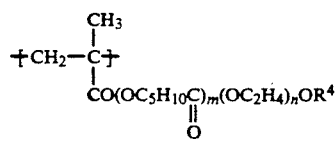

said second constituent is given by

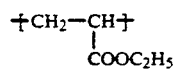

and said third constituent is given by

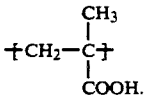

3. The curable unsaturated polyester resin composition of claim 1 wherein said first constituent is given by

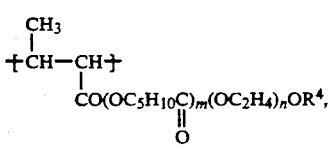

said second constituent is given by

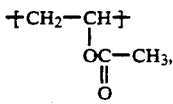

and said third constituent is given by

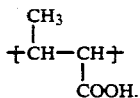

4. The curable unsaturated polyester resin composition of claim 1 wherein said graft copolymers have molecular weight between 20000 and 200000, said molecular weights being polystyrene equivalent values obtained by GPC method.

5. The curable unsaturated polyester resin composition of claim 2 wherein said graft copolymer have molecular weight between 20000 and 200000, said molecular weights being polystyrene equivalent values obtained by GPC method.

6. The curable unsaturated polyester resin composition of claim 33 wherein said graft copolymers have molecular weight between 20000 and 2000000, said molecular weights being polystyrene equivalent values obtained by GPC method.

7. The curable unsaturated polyester resin composition of claim 1 containing said graft copolymers by 10–100 weight % with respect to said unsaturated polyester.

8. The curable unsaturated polyester resin composition of claim 2 containing said graft copolymers by 10–100 weight % with respect to said unsaturated polyester.

9. The curable unsaturated polyester resin composition of claim 3 containing said graft copolymers by 10–100 weight % with respect to said unsaturated polyester.

10. The curable unsaturated polyester resin composition of claim 4 containing said graft copolymers by 10–100 weight % with respect to said unsaturated polyester.

11. The curable unsaturated polyester resin composition of claim 5 containing said graft copolymers by 10–100 weight % with respect to said unsaturated polyester.

12. The curable unsaturated polyester resin composition of claim 6 containing said graft copolymers by 10–100 weight % with respect to said unsaturated polyester.

* * * * *